Dec. 25, 1951     LA MAR S. COOPER     2,580,220
SECONDARY REFRIGERATION SYSTEM
Filed May 25, 1948
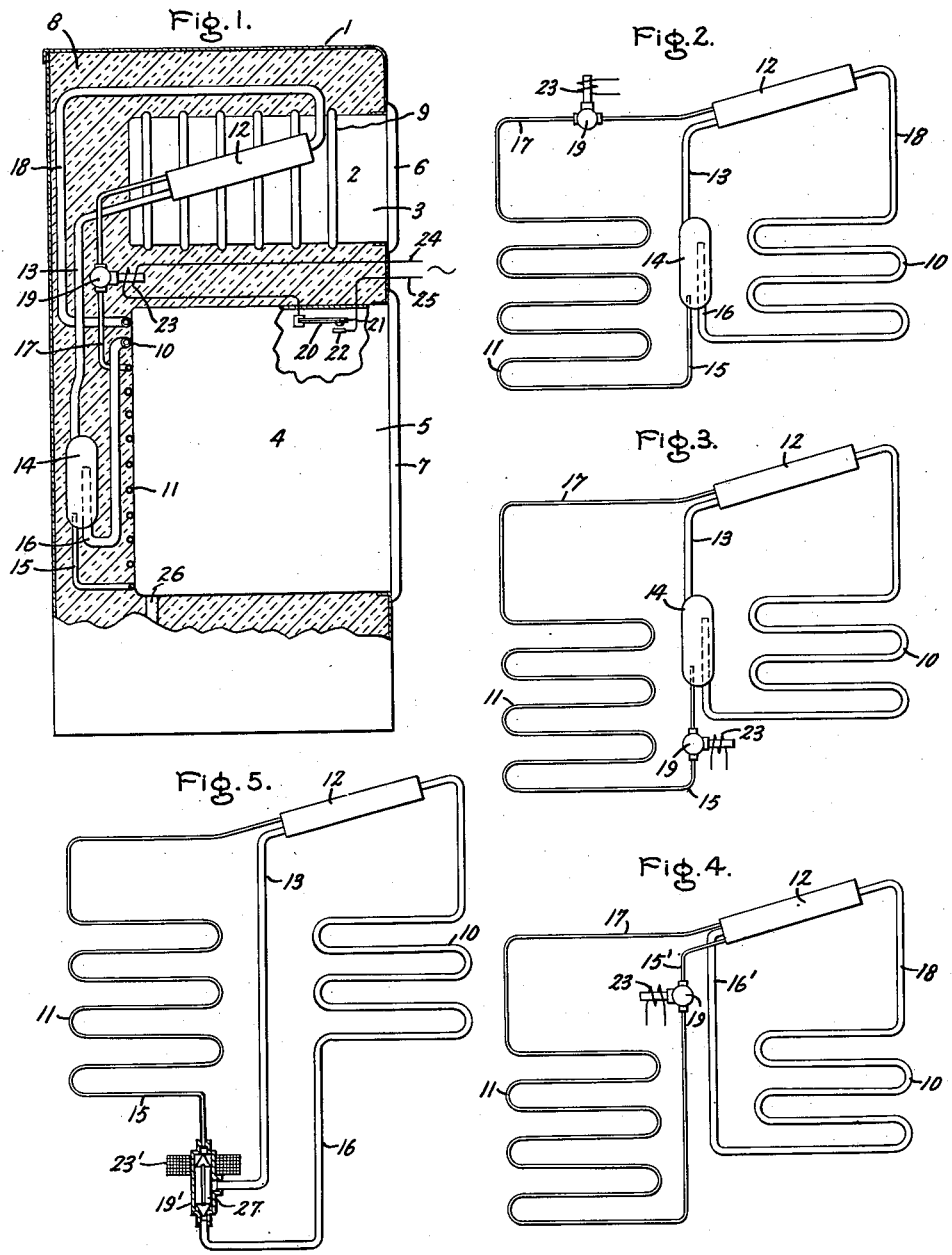
Inventor:
La Mar S. Cooper,
by William G. Edwards, Jr.
His Attorney.

Patented Dec. 25, 1951

2,580,220

UNITED STATES PATENT OFFICE 2,580,220

SECONDARY REFRIGERATION SYSTEM

La Mar S. Cooper, Cedar Rapids, Iowa, assignor to General Electric Company, a corporation of New York Application May 25, 1948, Serial No. 29,125

11 Claims. (Cl. 62—125)

My invention relates to refrigerators and more particularly to refrigerators employing a plurality of evaporators.

It is generally desirable to provide in household refrigerators a food storage compartment in which the atmosphere is maintained at a relatively high humidity to prevent the drying out of food stored therein. Where refrigeration is provided of such a nature as to secure a desirable humidity under low ambient temperature and no load conditions, it is sometimes found that under higher ambient conditions or under a heavy food or door opening load an excessively high humidity may develop in the food storage compartment. Thus a refrigerating arrangement which maintains an atmosphere of the desired humidity in the food storage compartment when the ambient temperature is in the order of 70 degrees F. and when there are no door openings or added food load may result in an excessively high humidity and in excessive condensation of water vapor or "sweating" in the food storage compartment when the ambient temperature is of the order of 100 degrees F. and when there are frequent door openings and heavy food load. By my invention this condition is avoided and a desirable humidity maintained under varying load and ambient temperature conditions by providing a plurality of properly disposed evaporators of different refrigerating capacities and operating characteristics for refrigerating the food storage compartment.

It is an object of my invention to provide a refrigerator including an improved arrangement for maintaining high relative humidity in a food storage compartment under no load, low ambient temperature conditions and avoiding excessive humidity under heavy load, high ambient temperature conditions.

It is another object of my invention to provide an improved refrigerator including two evaporators wherein one of the evaporators supplies refrigeration during no load, low ambient temperature conditions and the other evaporator automatically becomes effective during heavy load, high ambient temperature conditions.

It is a further object of my invention to provide a refrigerator including a secondary refrigerating system having two evaporating portions and a common condensing portion and including an improved arrangement for automatically supplying refrigerant from the common condensing portion to either of the evaporating portions.

Further objects and advantages of my invention will become apparent as the following description proceeds and the features of novelty which characterize my invention will be pointed out with particularity in the claims annexed to and forming part of this specification.

For a better understanding of my invention reference may be had to the accompanying drawing in which Fig. 1 is an elevation view, partly in section, of a refrigerator cabinet illustrating my invention; Fig. 2 is a diagrammatic representation of the refrigerating system shown in Fig. 1; Fig. 3 shows a modified form of my invention; Fig. 4 shows another modified form of my invention; and Fig. 5 shows still another modified form of my invention.

Referring to Fig. 1, there is shown a refrigerator cabinet 1 including a freezing compartment 2 formed by a metal liner 3 and a food storage compartment 4 formed by a metal liner 5. Access openings for the freezing and food storage compartments are covered by doors 6 and 7 respectively. Suitable insulating material 8 of low thermal conductivity is arranged within the cabinet 1 about the compartments 2 and 4.

The freezing compartment 2 is refrigerated by a primary evaporator formed by tubing 9. This tubing is secured to the exterior of the liner 3 of the freezing compartment. Liquid refrigerant is supplied to the primary evaporator from any conventional mechanical refrigerant condensing unit (not shown). This primary evaporator operates at a temperature in the neighborhood of 0° F.

The food storage compartment 4 is refrigerated by a secondary refrigerating system. The secondary refrigerating system includes an evaporating portion or evaporator 10, an evaporating portion or evaporator 11, and a common condensing portion or condenser 12. The closed secondary refrigerating system is provided with a charge of a volatile refrigerant. This refrigerant is vaporized in either the evaporating portion 10 or the evaporating portion 11, depending on the operation of the system at a particular time, as a result of heat extracted from the food storage compartment 4. The vaporized refrigerant passes to the condensing portion 12 where it is condensed, and the liquid refrigerant then flows to one of the evaporating portions 10 or 11. The condensing portion 12 is arranged in heat exchange contact with the tubing 9 of the primary evaporator and heat is extracted by the primary evaporator from the refrigerant vapor in the condensing portion 12 to effect condensation thereof.

The evaporating portions 10 and 11 are arranged on the exterior of the liner 5 of the food storage compartment in such a manner as to obtain the desired humidity conditions within the food storage compartment 4. The evaporating portion 11 is secured in heat exchange contact with the lower portion of the liner 5. The evaporating portion 10 is secured in similar heat exchange contact with the upper portion of this liner. Either or both of these evaporating portions may extend not only along the back of the liner but also along one or both sides thereof. Moreover, the evaporating portion 10 may be arranged along the top of the liner, and the evaporating portion 11 may also extend along the bottom of the liner. As indicated in the drawing, the evaporator portion 10 includes a smaller amount of larger diameter tubing than the evaporating portion 11. The evaporating portion 10 operates at a temperature below the freezing point of water and has a substantially larger refrigerating capacity than the evaporating portion 11. The evaporating portion 11 operates at a temperature above the freezing point of water and has a capacity sufficient to refrigerate the food storage compartment to a temperature in the order of 40° F. where the ambient temperature does not exceed 70° F. and under no load conditions. This arrangement of evaporators of different refrigerating capacities in the particular locations relative to the food storage compartment is described and broadly claimed in my application, Serial No. 29,124, filed concurrently with the present application and assigned to the same assignee.

Liquid refrigerant is supplied from the condensing portion 12 through a conduit 13 to a reservoir 14. From the reservoir 14 liquid refrigerant may flow through a conduit 15 to the evaporating portion 11 or through a conduit 16 to the evaporating portion 10. Vaporized refrigerant is returned to the condensing portion 12 from the evaporating portion 11 through a conduit 17 and vaporized refrigerant from the evaporating portion 10 flows to the condensing portion 12 through a conduit 18. Flow of vaporized refrigerant through the conduit 17 is controlled by a solenoid-operated valve 19. This valve is normally open, and may be closed through operation of a thermostat 20, which is arranged near the top of the access opening of the food storage compartment 4. The thermostat is thus affected promptly by door openings, which result in an increase in the temperature of the air in this region of the compartment. The thermostat 20 is shown in the form of a bimetallic strip which, under the proper temperature conditions, bends to bring the contacts 21, 22 into engagement. This closes the circuit of a coil 23 which operates the solenoid valve 19. Power for the coil 23 is supplied from any suitable source through lines 24, 25. Although the thermostat has been shown in the form of a bimetallic strip it is obvious that other conventional types of thermostats may be employed for closing the circuit of coil 23. For example, a feeler bulb may be located in the food storage compartment 4 near the top of the access opening thereof and this bulb may be connected by a tube to a bellows for closing the circuit to the coil 23.

The operation of the refrigerating system will now be described, referring to Fig. 2. As pointed out above, the evaporating portion 11 is designed to handle sufficient refrigerant to cool the food storage compartment to the desired temperature of about 40° F. under no load conditions and with an ambient temperature of about 70° F. When these conditions prevail liquid refrigerant from the condensing portion 12 flows through the conduit 13 to the reservoir 14. Liquid refrigerant passes from the reservoir through the conduit 15 to the evaporating portion 11. Vaporized refrigerant from the evaporating portion 11 passes through the conduit 17 and the open valve 19 to the condensing portion 12, where the vaporized refrigerant is condensed, completing the cycle. Under these conditions no refrigerant passes to the evaporating portion 10 since the end of the conduit 16, which is provided for carrying liquid refrigerant to the evaporating portion 10, extends a substantial distance above the bottom of the reservoir 14. The end of the conduit 15 on the other hand is located near the bottom of the reservoir 14. Accordingly, liquid refrigerant supplied to the reservoir 14 is preferentially directed to the evaporating portion 11 and the level of liquid refrigerant in the reservoir 14 does not rise high enough for liquid refrigerant to flow into the conduit 16. Since the evaporating portion 11 operates at a temperature above the freezing point of water a high relative humidity is maintained in the food storage compartment 4, thereby minimizing the drying out of foods stored therein.

Should the ambient temperature rise above 70° F. or should an additional load be imposed on the refrigerating system because of frequent door openings or the placing of an additional food load in the food storage compartment 4, the refrigeration requirements exceed the capacity of the evaporating portion 11. Under these conditions the temperature in the food storage compartment, and particularly the temperature at the top of the access opening thereof, rises above the predetermined maximum temperature for which the thermostat 20 is set. The thermostat 20 then closes the contacts 21, 22, energizing the coil 23 to close the valve 19. This prevents the return of vaporized refrigerant from the evaporating portion 11 to the condensing portion 12 and causes a backing up of liquid refrigerant into the reservoir 14. Ultimately the level of liquid refrigerant in the reservoir 14 reaches the top of the conduit 16 and liquid refrigerant is then supplied to the evaporating portion 10. The evaporating portion 10 is composed of tubing of a larger diameter than the evaporating portion 11 and is able to handle a much larger amount of refrigerant. The evaporating portion 10 thus operates at a temperature below the freezing point of water and has a capacity sufficient to refrigerate the food storage compartment 4 where the ambient temperature may be of the order of 100° F. and where a heavy load is imposed on the refrigerator. Were the food storage compartment 4 to be refrigerated by the evaporating portion 11 alone under these conditions an excessively high humidity would result in the food storage compartment, this excessively high humidity condition being aggravated, of course, by the frequent door openings and by the moisture content of additional food placed in the compartment. A substantial amount of "sweating" in the interior of the refrigerator and of condensation of moisture on foods stored therein might result. However, by utilizing the evaporating portion 10 which operates at a temperature below the freezing point of water such excessive humidity and "sweating" is avoided. Moisture in the air in the food storage compartment 4 condenses on the liner of the compartment in the area of the evaporating portion 10. As the refrigeration continues, frost is formed on the liner in this area. When the temperature of the air in the food storage compartment has been reduced below the maximum for which the thermostat 20 is set, the coil 23 is deenergized, and the valve 19 returns to its open position. This again permits passage of vaporized refrigerant to the condensing portion 12 and lowers the level of liquid refrigerant in the reservoir 14 below the top of the conduit 16, thereby cutting off the supply of liquid refrigerant to the evaporating portion 10. The frost formed on the liner then melts and the water flows down the back of the liner and is discharged from the food storage compartment through a drain 26 into any suitable receptacle (not shown). Any excessive moisture present in the air within the food storage compartment because of door openings, placing of additional food load in the compartment, and high ambient temperature is thus removed from the compartment. It can be seen, therefore, that by my arrangement a desirable high humidity is maintained in the food storage compartment during low ambient temperature, no load conditions and any excessively high humidity under high ambient temperature, heavy load conditions is avoided. Further, this maintenance of proper humidity conditions is achieved automatically by placing one or the other of the two evaporating portions in operation.

Referring now to Fig. 3, the arrangement there illustrated differs from that shown in Fig. 2 only in that the valve 19 is arranged in the conduit 15 which supplies liquid refrigerant to the evaporating portion 11 instead of the conduit 17 which returns vaporized refrigerant from the evaporating portion 11 to the condensing portion 12. The operation is similar to that described in connection with Fig. 2, closing of the valve 19 resulting in a blocking of the passage of liquid refrigerant through the conduit 15 and a consequent raising of the level of liquid refrigerant in the reservoir 14.

In Fig. 4 there is illustrated an arrangement wherein the condensing portion 12 also serves the function of a reservoir from which the liquid refrigerant may be directed to either the evaporating portion 10 or the evaporating portion 11. As the vaporized refrigerant condenses in the inclined condensing portion 12 it flows to the lower end thereof. The liquid line 15' leading to the evaporating portion 11 is connected to the condensing portion 12 near the bottom thereof. The liquid line 16' which carries liquid refrigerant to the evaporating portion 10 is connected to the condensing portion 12 some distance above the bottom of the condensing portion 12. Accordingly, under low ambient temperature, no load conditions, where the valve 19 is occupying its normally open position, liquid refrigerant is preferentially supplied to the conduit 15' and thence to the evaporating portion 11. The level of the liquid refrigerant in the condensing portion 12 does not reach the opening of the conduit 16'. Where higher ambient temperature conditions or heavy loads result in an increase in temperature within the compartment 4 above a predetermined maximum and a consequent closing of the valve 19, flow of liquid refrigerant through the conduit 15' is blocked. Consequently, the level of liquid refrigerant in the lower end of the condensing portion 12 reaches the level of the conduit 16' at its connection to the condensing portion 12, and liquid refrigerant then flows to the evaporating portion 10. The operation of this system is otherwise the same as that of the system described in connection with Fig. 2.

In the refrigerating system shown in Fig. 5 a solenoid valve 19' is arranged to direct liquid refrigerant positively to either the evaporating portion 10 or the evaporating portion 11. A valve element 27 is normally positioned by gravity to close the passage through the conduit 16 to the evaporating portion 10 and to open the passage through the conduit 15 to the evaporating portion 11. Thus under low ambient temperature, no load conditions the liquid refrigerant passes from the condensing portion 12 through the conduit 13 to the solenoid valve 19' and thence through the conduit 15 to the evaporating portion 11. Under high ambient temperature or heavy load conditions which result in an increase in the temperature of the air in the compartment 4 the coil 23' is energized to lift the valve element 27 for closing the passage to the conduit 15 and opening the passage to the conduit 16. Liquid refrigerant is then supplied to the evaporating portion 10 until the temperature of the air in the compartment 4 has been satisfactorily lowered.

The arrangement of the evaporating portions 10 and 11 is designed to secure a low temperature gradient between the top and bottom of the compartment 4. Thus the evaporating portion 11 which operates above the freezing point of water and hence not far below the temperature of about 40° F. maintained in the food storage compartment is placed along the lower portion of the liner. This gives a minimum convection of air within the compartment 4, and such minimum convection is sufficient to maintain the desirable low temperature gradient since the difference between the evaporator temperature and the temperature of the air in the compartment 4 is small. On the other hand the evaporating portion 10 which operates at a temperature below the freezing point of water and hence at a temperature differing substantially from that normally maintained in the compartment 4 is arranged along the upper portion of the liner 5. The air cooled by the evaporating portion 10 at the upper portion of the compartment 4 tends to descend to the bottom of the compartment and a maximum convection is achieved. This maximum convection assists in maintaining a low temperature gradient between the top and bottom of the compartment 4.

While I have shown and described specific embodiments of my invention as applied to a two-temperature household refrigerator, I do not desire my invention to be limited to the particular constructions shown and I intend, by the appended claims, to cover all modifications within the spirit and scope of my invention.

What I claim as new and desire to secure by Letters Patent of the United States is:

1. Refrigerating apparatus including a cabinet having a food storage compartment, a liner for said food storage compartment, a first evaporator secured to the lower portion of said liner for refrigerating said food storage compartment, a second evaporator secured to the upper portion of said liner for directly refrigerating said compartment, means including a refrigerant condensing unit for supplying refrigerant to said first evaporator for operation at a temperature above the freezing point of water to maintain a high relative humidity in said compartment and for supplying refrigerant to said second evaporator for operation at a temperature below the freezing point of water to prevent excessively high humidity in said compartment, means responsive to a predetermined temperature within said food storage compartment for discontinuing refrigeration by said first evaporator, and means rendered effective only upon discontinuation of refrigeration by said first evaporator for directing refrigerant to said second evaporator.

2. Refrigerating apparatus including a cabinet having a food storage compartment, a liner for said food storage compartment, a secondary refrigerating system, said secondary refrigerating system including two evaporating portions, one of said evaporating portions being secured to the lower portion of said liner, means including a condensing portion for supplying refrigerant to said one of said evaporating portions for operation at a temperature above the freezing point of water, the other of said evaporating portions being secured to the upper portion of said liner, means including said condensing portion for supplying refrigerant to said other of said evaporating portions for operation at a temperature below the freezing point of water, a reservoir for liquid refrigerant, means for conducting liquid refrigerant from said condensing portion to said reservoir, means for conducting refrigerant from said reservoir to said one of said evaporating portions, means responsive to a predetermined temperature within said food storage compartment for preventing flow of refrigerant through said one of said evaporating portions, and means rendered effective when flow of refrigerant through said one of said evaporating portions is prevented for delivering refrigerant from said reservoir to said other of said evaporating portions.

3. Refrigerating apparatus including a cabinet having a food storage compartment, a liner for said food storage compartment, a first evaporator secured to the lower portion of said liner for refrigerating said food storage compartment, means including a refrigerant condensing unit for supplying refrigerant to said first evaporator for operation at a temperature above the freezing point of water, a second evaporator secured to the upper portion of said liner for refrigerating said compartment, means including said refrigerant condensing unit for supplying refrigerant to said second evaporator for operation at a temperature below the freezing point of water, a reservoir for liquid refrigerant, a first liquid line opening into said reservoir for conducting liquid refrigerant from said reservoir to said first evaporator, a second liquid line opening into said reservoir for conducting liquid refrigerant from said reservoir to said second evaporator, said first liquid line opening into said reservoir at a lower level than said second liquid line whereby liquid refrigerant is preferentially supplied through said first liquid line to said first evaporator, and means responsive to a predetermined temperature within said compartment for preventing flow of refrigerant through said first evaporator, the operation of said last-mentioned means affording accumulation of liquid refrigerant in said reservoir to raise the level of liquid refrigerant therein whereby liquid refrigerant is supplied through said second liquid line to said second evaporator.

4. Refrigerating apparatus including a cabinet having a food storage compartment, a liner for said food storage compartment, a first evaporator secured to the lower portion of said liner for refrigerating said compartment, means including a refrigerant condensing unit for supplying refrigerant to said first evaporator for operation at a temperature above the freezing point of water, a second evaporator secured to the upper portion of said liner for refrigerating said compartment, means including said refrigerant condensing unit for supplying refrigerant to said second evaporator for operation at a temperature below the freezing point of water, a reservoir for liquid refrigerant, a first liquid line opening into said reservoir for conducting liquid refrigerant from said reservoir to said first evaporator, a second liquid line opening into said reservoir for conducting liquid refrigerant from said reservoir to said second evaporator, said first liquid line opening into said reservoir at a lower level than said second liquid line whereby liquid refrigerant is preferentially supplied to said first evaporator, a valve in said first liquid line for controlling the flow of refrigerant to said first evaporator, and means responsive to a predetermined temperature within said compartment for closing said valve, the closing of said valve affording accumulation of liquid refrigerant in said reservoir to raise the level of liquid refrigerant therein whereby liquid refrigerant is supplied to said second evaporator.

5. Refrigerating apparatus including a cabinet having a food storage compartment, a liner for said food storage compartment, a first evaporator secured to the lower portion of said liner for refrigerating said food storage compartment, means including a refrigerant condensing unit for supplying refrigerant to said first evaporator for operation at a temperature above the freezing point of water, a second evaporator secured to the upper portion of said liner for refrigerating said compartment, means including said refrigerant condensing unit for supplying refrigerant to said second evaporator for operation at a temperature below the freezing point of water, a reservoir for liquid refrigerant, a first liquid line opening into said reservoir for conducting liquid refrigerant from said reservoir to said first evaporator, a second liquid line opening into said reservoir for conducting liquid refrigerant from said reservoir to said second evaporator, said first liquid line opening into said reservoir at a lower level than said second liquid line whereby liquid refrigerant is preferentially supplied to said first evaporator, a first vapor line for conducting vaporized refrigerant from said first evaporator, a second vapor line for conducting vaporized refrigerant from said second evaporator, a valve in said first vapor line for controlling flow of vaporized refrigerant therethrough, and means responsive to a predetermined maximum temperature within said compartment for closing said valve to prevent flow of vaporized refrigerant through said first vapor line, the closing of said valve affording accumulation of liquid refrigerant in said reservoir to raise the level of liquid refrigerant therein whereby liquid refrigerant is supplied from said reservoir to said second evaporator.

6. Refrigerating apparatus including a cabinet having a food storage compartment, a liner for said food storage compartment, a secondary refrigerating system including two evaporating portions for refrigerating said compartment, one of said evaporating portions being secured to the lower portion of said liner, the other of said evaporating portions being secured to the upper portion of said liner, means including a condensing portion for supplying refrigerant to said one of said evaporating portions for operation at a temperature above the freezing point of water, means including said condensing portion for supplying refrigerant to said other of said evaporating portions for operation at a temperature below the freezing point of water, a reservoir for liquid refrigerant, means for conducting liquid refrigerant from said condensing portion to said reservoir, a first liquid line opening into said reservoir for conducting liquid refrigerant from said reservoir to said one of said evaporating portions, a second liquid line opening into said reservoir for conducting liquid refrigerant from said reservoir to said other of said evaporating portions, said first liquid line opening into said reservoir at a lower level than said second liquid line whereby liquid refrigerant is preferentially supplied to said one of said evaporating portions, a valve in said first liquid line for controlling the flow of refrigerant to said first of said evaporating portions, and means responsive to a predetermined maximum temperature within said compartment for closing said valve, the closing of said valve affording accumulation of liquid refrigerant in said reservoir to raise the level of liquid refrigerant therein whereby liquid refrigerant is supplied to said other of said evaporating portions.

7. Refrigerating apparatus including a cabinet having a food storage compartment, a liner for said food storage compartment, a secondary refrigerating system including two evaporating portions for refrigerating said compartment, one of said evaporating portions being secured to the lower portion of said liner, the other of said evaporating portions being secured to the upper portion of said liner, means including a condensing portion for supplying refrigerant to said one of said evaporating portions for operation at a temperature above the freezing point of water, and for supplying refrigerant to said other of said evaporating portions for operation at a temperature below the freezing point of water, a reservoir for liquid refrigerant, means for conducting liquid refrigerant from said condensing portion to said reservoir, a first liquid line opening into said reservoir for conducting liquid refrigerant from said reservoir to said one of said evaporating portions, a second liquid line opening into said reservoir for conducting liquid refrigerant to said other of said evaporating portions, said first liquid line opening into said reservoir at a lower level than said second liquid line whereby liquid refrigerant is preferentially supplied to said one of said evaporating portions, a first vapor line for returning vaporized refrigerant from said one of said evaporating portions to said condensing portion, a second vapor line for returning vaporized refrigerant from said other of said evaporating portions to said condensing portion, a valve in said first vapor line for preventing return of vaporized refrigerant to said condensing portion from said one of said evaporating portions, and means responsive to a predetermined maximum temperature within said compartment for closing said valve, the closing of said valve affording accumulation of liquid refrigerant in said reservoir to raise the level of liquid refrigerant therein whereby liquid refrigerant is supplied from said reservoir to said other of said evaporating portions.

8. Refrigerating apparatus including a cabinet having a food storage compartment, a secondary refrigerating system for cooling said compartment, said secondary system comprising a condensing portion and two evaporating portions, said condensing portion being inclined to direct condensed refrigerant to the lower end thereof, a first liquid line opening into said condensing portion for supplying liquid refrigerant to one of said evaporating portions, a second liquid line opening into said condensing portion for supplying liquid refrigerant to the other of said evaporating portions, said first liquid line opening into said condensing portion at a lower level than said second liquid line whereby liquid refrigerant is preferentially supplied to said one of said evaporating portions, and a valve for controlling flow of refrigerant through said one of said evaporating portions, said valve being actuated to its closed position in response to a predetermined maximum temperature within said compartment, the closing of said valve affording accumulation of liquid refrigerant in said condensing portion to raise the level of liquid refrigerant therein whereby liquid refrigerant is supplied from said condensing portion to said other of said evaporating portions.

9. Refrigerating apparatus including a cabinet having a food storage compartment, a liner for said food storage compartment, a secondary refrigerating system for cooling said compartment, said secondary system including a condensing portion and two evaporating portions, one of said evaporating portions being secured to the lower portion of said liner and including a substantial length of tubing of relatively small diameter, the other of said evaporating portions being secured to the upper portion of said liner and including a smaller length of tubing of substantially greater diameter than said one of said evaporating portions, a reservoir for liquid refrigerant, a conduit for supplying liquid refrigerant from said condensing portion to said reservoir, means for supplying liquid refrigerant from said reservoir to said one of said evaporating portions, means responsive to a predetermined maximum temperature within said compartment for preventing flow of refrigerant through said one of said evaporating portions, and means dependent upon the prevention of flow of refrigerant through said one of said evaporating portions for effecting delivery of refrigerant from said reservoir to said other of said evaporating portions.

10. Refrigerating apparatus including a refrigerator having a food storage compartment, a liner for said food storage compartment, a first evaporator secured to the lower portion of said liner for refrigerating said food storage compartment, means including a refrigerant condensing unit for supplying refrigerant to said first evaporator for operation at a temperature above the freezing point of water, a second evaporator secured to the upper portion of said liner for directly refrigerating said compartment, means including said refrigerant condensing unit for supplying refrigerant to said second evaporator for operation at a temperature below the freezing point of water, and a solenoid-operated valve energized in response to a predetermined maximum temperature within said storage compartment for discontinuing refrigeration by said first evaporator and for simultaneously directing refrigerant to said second evaporator.

11. Refrigerating apparatus including a refrigerator having a food storage compartment, a liner for said food storage compartment, a secondary refrigerating system, said secondary system including two evaporating portions, one of said evaporating portions being secured to the lower portion of said liner, means including a condensing portion for supplying refrigerant to said one of said evaporating portions for operation at a temperature above the freezing point of water, the other of said evaporating portions being secured to the upper portion of said liner, means including said condensing portion for supplying refrigerant to said other of said evaporating portions for operation at a temperature below the freezing point of water, means for conducting refrigerant from said condensing portion, a solenoid-operated valve disposed between said last-mentioned means and said evaporating portions for directing refrigerant alternatively to either of said evaporating portions, said valve preferentially directing refrigerant to said one of said evaporating portions, and means responsive to a predetermined maximum temperature within said compartment for actuating said valve to direct refrigerant to said other of said evaporating portions.

LA MAR S. COOPER.

REFERENCES CITED

The following references are of record in the file of this patent:

UNITED STATES PATENTS

| Number | Name | Date |
|---|---|---|
| 2,146,796 | Dasher | Feb. 14, 1939 |
| 2,292,405 | Reeves | Aug. 11, 1942 |
| 2,312,861 | Atchison | Mar. 2, 1943 |
| 2,386,919 | Tobey | Oct. 16, 1945 |
| 2,416,777 | Schweller | Mar. 4, 1947 |
| 2,426,578 | Tobey | Aug. 26, 1947 |
| 2,434,361 | Iwashita | June 13, 1948 |
| 2,455,850 | Atchison | Dec. 7, 1948 |
| 2,471,137 | Atchison | May 24, 1949 |